US012763268B2

(12) United States Patent
Gim

(10) Patent No.: US 12,763,268 B2

(45) Date of Patent: Oct. 13, 2026

(54) ELECTRIC DOUBLE LAYER CAPACITOR

(71) Applicant: LS MATERIALS CO., LTD., Anyang-si (KR)

(72) Inventor: Gi Hyo Gim, Gunpo-si (KR)

(73) Assignee: LS MATERIALS CO., LTD., Anyang-si (KR)

( * ) Notice: Subject to any disclaimer, the term of this patent is extended or adjusted under 35 U.S.C. 154(b) by 118 days.

(21) Appl. No.: 18/683,091

(22) PCT Filed: Apr. 12, 2022

(86) PCT No.: PCT/KR2022/005252

§ 371 (c)(1),
(2) Date: Feb. 12, 2024

(87) PCT Pub. No.: WO2023/033291

PCT Pub. Date: Mar. 9, 2023

(65) Prior Publication Data

US 2024/0379299 A1 Nov. 14, 2024

(30) Foreign Application Priority Data

Aug. 31, 2021 (KR) ........................ 10-2021-0115246

(51) Int. Cl.
*H01G 11/76* (2013.01)
*H01G 11/82* (2013.01)

(52) U.S. Cl.
CPC ............. *H01G 11/76* (2013.01); *H01G 11/82* (2013.01)

(58) Field of Classification Search
None
See application file for complete search history.

(56) References Cited

U.S. PATENT DOCUMENTS

2003/0086239 A1* 5/2003 Bendale ................. H01G 11/80 361/502
2006/0228620 A1* 10/2006 Martinson ........... H01M 50/167 429/185
2012/0081839 A1* 4/2012 Sakurai ............... H01M 10/052 361/528
2014/0226261 A1* 8/2014 Sakata ................... H01G 11/80 524/239

(Continued)

FOREIGN PATENT DOCUMENTS

CN 202887989 U * 4/2013 ............. H01G 11/78
CN 203192894 U 9/2013
CN 108054027 A * 5/2018 ............. H01G 11/80

(Continued)

OTHER PUBLICATIONS

Translation CN 202887989 U (no date).*

(Continued)

*Primary Examiner* — Eric W Thomas

(74) *Attorney, Agent, or Firm* — K&L Gates LLP

(57) ABSTRACT

An electric double layer capacitor may be provided having a bare cell; a case for accommodating the bare cell; a first internal terminal disposed on the top side of the bare cell; a second internal terminal disposed on the bottom side of the bare cell; a first external terminal coupled to the first internal terminal; and a coupling part, which is disposed on the bottom side of the first external terminal and supports the edge of the first internal terminal.

7 Claims, 8 Drawing Sheets

(56) References Cited

U.S. PATENT DOCUMENTS

| | | | | |
|---|---|---|---|---|
| 2018/0047973 | A1 | 2/2018 | Kunoike et al. | |
| 2024/0313305 | A1* | 9/2024 | Daira .................. | H01M 50/198 |

FOREIGN PATENT DOCUMENTS

| | | | | | |
|---|---|---|---|---|---|
| EP | 2980818 | A1 * | 2/2016 | ............. | H01G 11/74 |
| KR | 101159652 | B1 | 6/2012 | | |
| KR | 20130085565 | A | 7/2013 | | |
| KR | 101296224 | B1 | 9/2013 | | |
| KR | 101345224 | B1 | 12/2013 | | |
| KR | 20170019752 | A | 2/2017 | | |
| WO | WO-2022181338 | A1 * | 9/2022 | ........ | H01M 10/0431 |

OTHER PUBLICATIONS

International Search Report for related International Application No. PCT/KR2022/005252; action dated Mar. 9, 2023; (3 pages).

Written Opinion for related International Application No. PCT/KR2022/005252; action dated Mar. 9, 2023; (4 pages).

Extended European Search Report for related European Application No. 22864800.2; action dated Sep. 19, 2025; (9 pages).

* cited by examiner

ELECTRIC DOUBLE LAYER CAPACITOR

CROSS-REFERENCE TO RELATED APPLICATIONS

This application is a National Stage of International Application No. PCT/KR2022/005252, filed on Apr. 12, 2022, which claims priority to and the benefit of Korean Patent Application No. 10-2021-0115246, filed on Aug. 31, 2021, the disclosures of which is incorporated herein by reference in its entirety.

FIELD

The present disclosure relates to an electric double layer capacitor for storing energy such as electrical energy or the like.

BACKGROUND

Batteries, capacitors, etc., are representative energy storage devices for storing electrical energy. Among the capacitors, ultracapacitors (UCs) have high efficiency, semi-permanent lifetime, and fast charging and discharging characteristics, and thus the market for UCs is being formed as energy storage devices that can compensate the short cycle and instantaneous high voltage problems that are the weaknesses of secondary batteries.

Based on the above advantages, UCs are widely used not only as auxiliary power sources for mobile devices such as mobile phones, tablet personal computers (PCs), notebook computers, and the like, but also as main or auxiliary power sources for electric vehicles, hybrid vehicles, solar cell power supplies, night road lights, uninterrupted power supplies (UPS), and the like that require high capacity.

FIGS. 1 and 2 are schematic views illustrating an electric double layer capacitor according to the related art.

Referring to FIGS. 1 and 2, the electric double layer capacitor according to the related art is implemented so that a first external terminal 2 and a first terminal coupling part 3 are inserted into a case 4 and then the first terminal coupling part 3 is coupled to the first external terminal 2 by performing beading process from the outside of the case 4. Further, the electric double layer capacitor according to the related art is implemented so that a second terminal coupling part 7 and a second external terminal 6 are inserted into the case 4 and then the second terminal coupling part 7 and the second external terminal 6 are coupled by performing beading process from the outside of the case 4.

In this way, since the first terminal coupling part 3 and the first external terminal 2 are coupled through beading process performed from the outside, the electric double layer capacitor according to the related art has problems in that a contact failure 5 occurs between the first terminal coupling part 3 and the first external terminal 2 and a coupling force between the first terminal coupling part 3 and the first external terminal 2 is weak.

SUMMARY

The present disclosure is directed to providing an electric double layer capacitor of which a coupling force may be prevented from being reduced due to beading process performed from the outside.

In order to achieve the above-described object, the present disclosure may include the following configurations.

One aspect of the present disclosure provides an electric double layer capacitor including a bare cell; a case configured to accommodate the bare cell; a first internal terminal disposed above the bare cell; a second internal terminal disposed below the bare cell: a first external terminal coupled to the first internal terminal; and a coupling part disposed on a bottom side of the first external terminal and supporting an edge of the first internal terminal.

Another aspect of the present disclosure provides an electric double layer capacitor including a bare cell: a case configured to accommodate the bare cell: a first internal terminal disposed above the bare cell: a second internal terminal disposed below the bare cell; a first external terminal coupled to the first internal terminal; and a welding coupling part melted to couple an edge of the first internal terminal and a lower part of the first external terminal.

According to the present disclosure, the following effects can be achieved.

The present disclosure is implemented to enhance a connection force or coupling force between a first internal terminal and a first external terminal. Accordingly, the present disclosure can reduce equivalent serial resistance (ESR) for the first internal terminal and the first external terminal. Therefore, the present disclosure can have improved energy storage performance.

In the present disclosure, since the first internal terminal and the first external terminal are coupled at the outside of a case and then inserted into the case, the case requires no work space for the coupling of the first internal terminal and the first external terminal. Therefore, the present disclosure can be implemented to have greater energy density because a size of the case can be reduced while maintaining a size of a bare cell.

DETAILED DESCRIPTION

Hereinafter, embodiments of an electric double layer capacitor according to the present disclosure will be described in detail with reference to the accompanying drawings.

Figure 1:
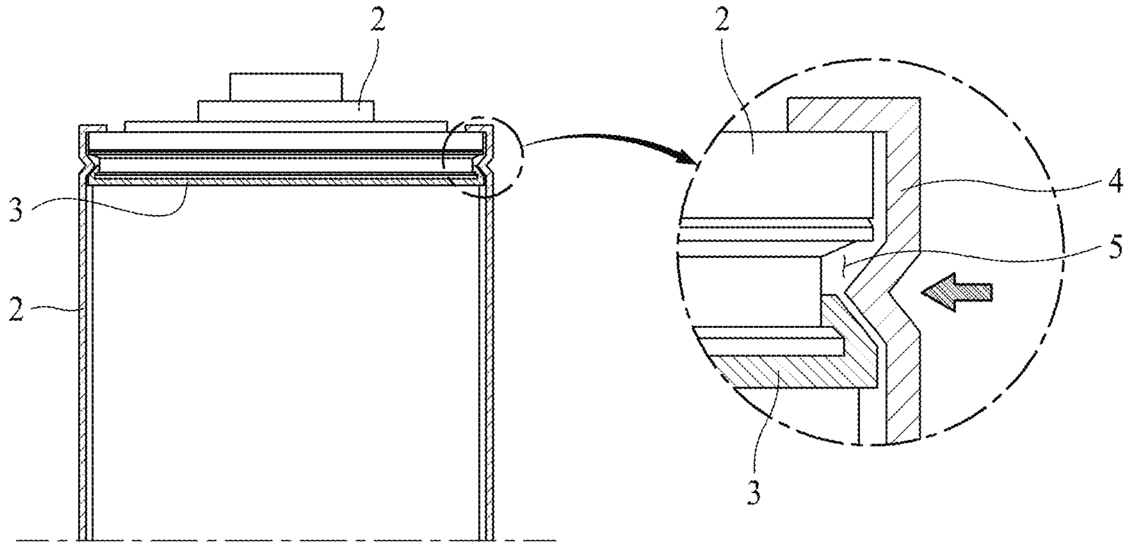
FIG. 1 (Prior Art)
FIGS. 1 and 2 are schematic views illustrating an electric double layer capacitor according to the related art.
Figure 2:
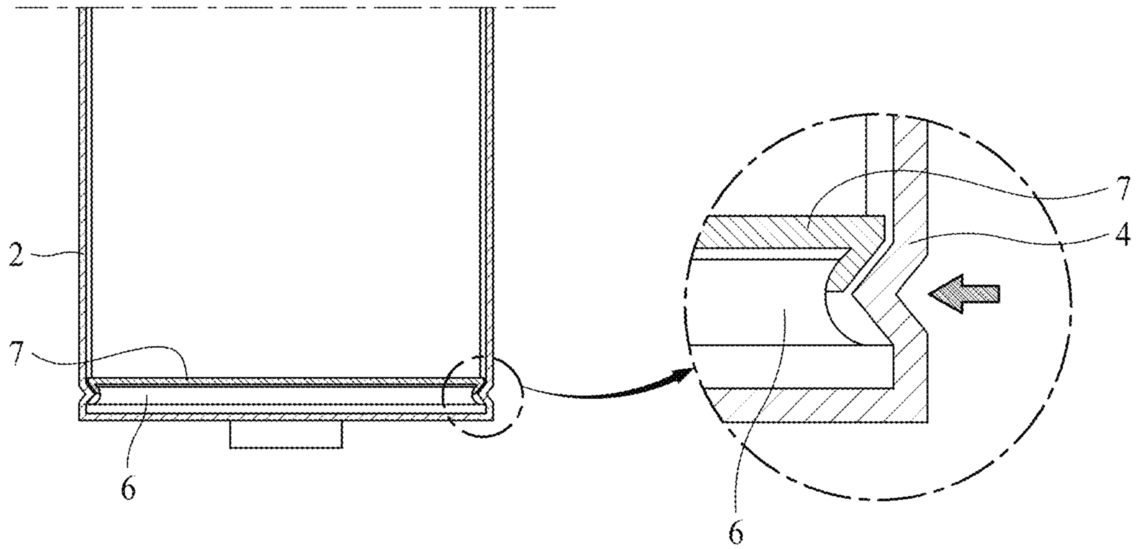
FIG. 2 (Prior Art)
Figure 3:
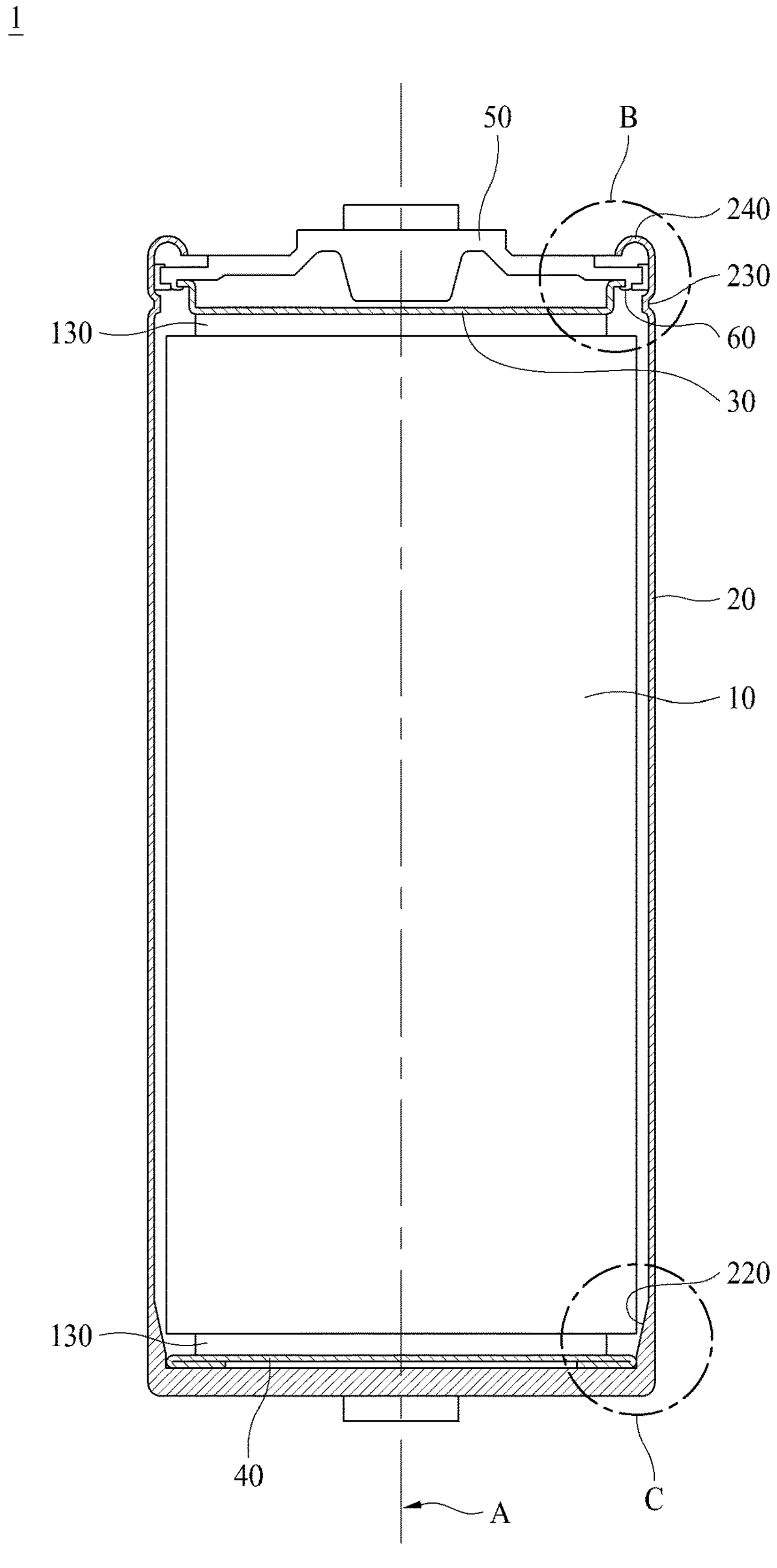
FIG. 3 is a schematic view illustrating an electric double layer capacitor according to the present disclosure.

Referring to FIG. 3, an electric double layer capacitor 1 according to the present disclosure is for storing electrical energy. The electric double layer capacitor 1 according to the present disclosure may include a bare cell 10, a case 20, a first internal terminal 30, a second internal terminal 40, a first external terminal 50, and a coupling part 60. The first internal terminal 30 and the second internal terminal 40 may be included in internal terminals. The first external terminal

50 and the second external terminal may be included in external terminals. In this case, the second external terminal may correspond to the case 20.

Figure 4:
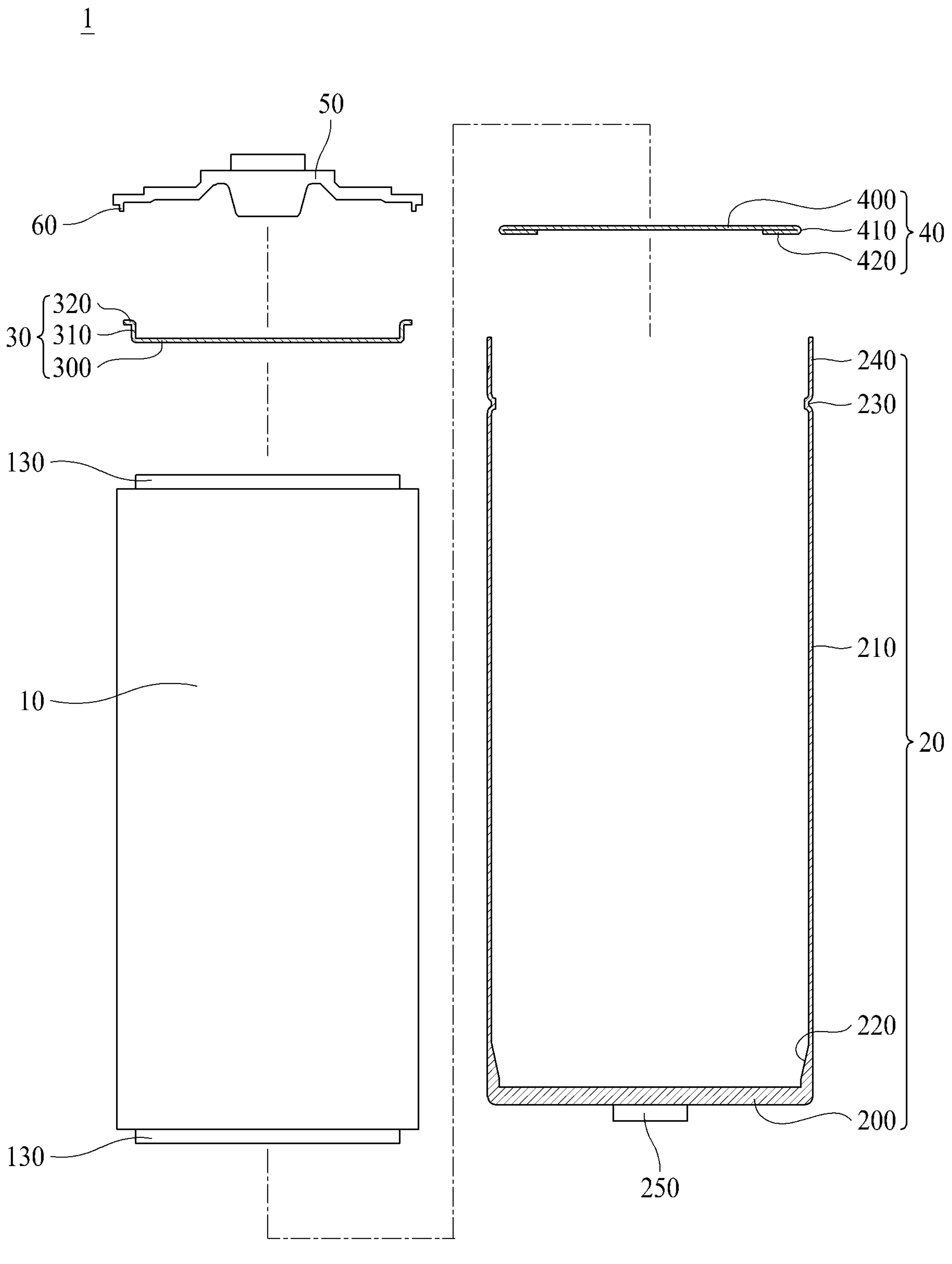
FIG. 4 is an exploded perspective view of the electric double layer capacitor illustrated in FIG. 3.
Figure 5:
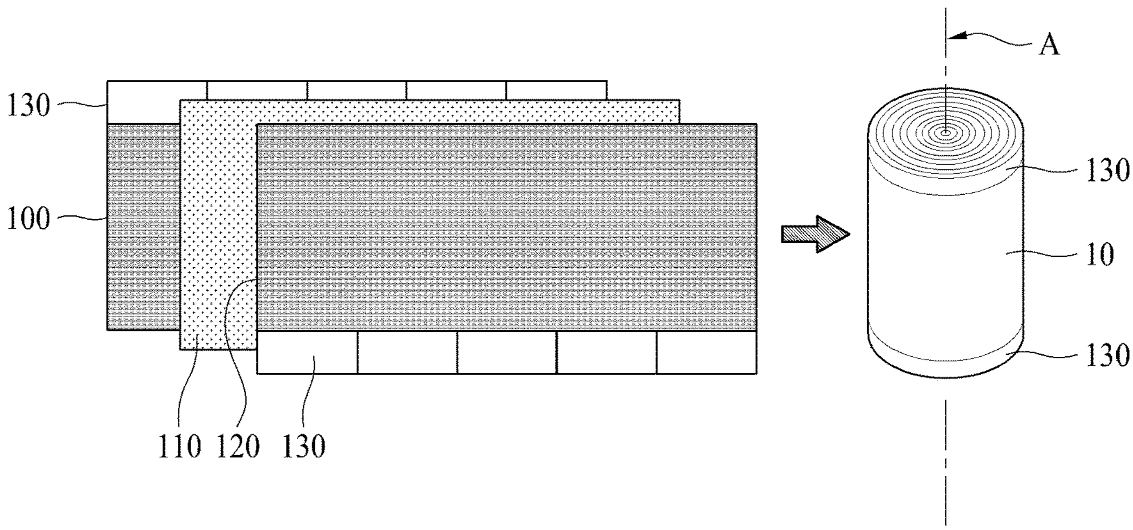
FIG. 5 is a view illustrating an example of a bare cell illustrated in FIG. 3.
Figure 6:
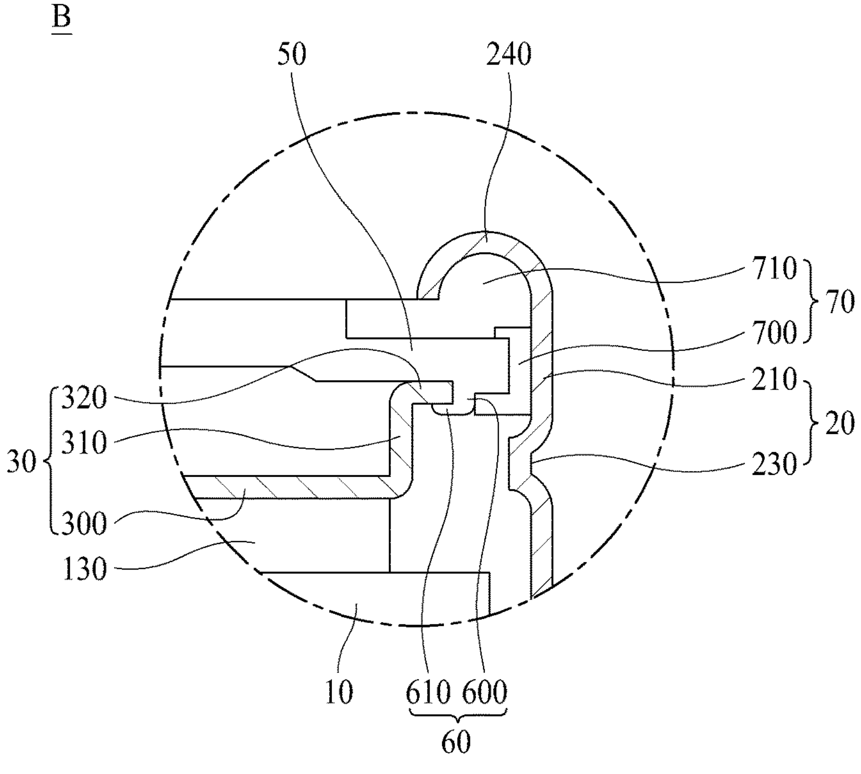
FIG. 6 is an enlarged view of portion B in FIG. 3.

Referring to FIGS. 3 to 5, the bare cell 10 is accommodated in the case 20. The bare cell 10 is called an electrode element and may be implemented as an ultracapacitor (UC).

A first electrode 100, a second electrode 120 having a polarity opposite to that of the first electrode 100, and a separator 110, which is disposed between the first electrode 100 and the second electrode 120 to electrically separate the first electrode 100 from the second electrode 120, may be wound to form the bare cell 10. In an embodiment, when the first electrode 100 is a positive electrode (+), the second electrode 120 is a negative electrode (−). Conversely, when the first electrode 100 is a negative electrode (−), the second electrode 120 is a positive electrode (+). The bare cell 10 may be implemented to be wound around a central axis A. As the size of the bare cell 10 increases, the electric double layer capacitor 1 according to the present disclosure may have a larger storage capacity. The bare cell 10 may be formed in a cylindrical shape extending along a circumferential direction relative to the central axis A and having an upper and lower surface.

The bare cell 10 may include an electrode lead 130. The electrode lead 130 may be drawn from an end of the bare cell 10 in a direction of the central axis A. The electrode lead 130 may be connected to each of the first electrode 100 and the second electrode 120 facing each other. In an embodiment, the electrode lead 130 may include a negative electrode lead wire and a positive electrode lead wire. The negative electrode lead wire may be connected to any one of the first electrode 100 and the second electrode 120, and the positive electrode lead wire may be connected to the other one of the first electrode 100 and the second electrode 120. The electrode lead 130 may be connected to the first internal terminal 30 and the second internal terminal 40. The electrode lead 130 may be coupled to the first internal terminal 30 and the second internal terminal 40 by laser welding.

Referring to FIGS. 3 to 5, the case 20 accommodates the bare cell 10. The bare cell 10 may be disposed inside the case 20. The case 20 may be formed in a cylindrical shape with an entirely hollow interior, but the present disclosure is not limited thereto, and the case 20 may be formed in another shape as long as it can accommodate the bare cell 10.

The case 20 may include a bottom part 200 and a sidewall part 210.

The bottom part 200 corresponds to a lower surface of the case 20. The bottom part 200 may support the bare cell 10 accommodated into the case 20.

The sidewall part 210 is disposed on an edge of the bottom part 200. The edge of the bottom part 200 may be an outer side surface of the bottom part 200. The sidewall part 210 may correspond to a side surface of the case 20. When the bare cell 10 is accommodated into the case 20, the sidewall part 210 may be disposed to surround a periphery of the bare cell 10.

Referring to FIGS. 3 to 5, the first internal terminal 30 is disposed above the bare cell 10. The first internal terminal 30 may be electrically connected to the top side of the bare cell 10. In this case, the first internal terminal 30 may be connected to the electrode lead 130 of the bare cell 10. The first internal terminal 30 may be coupled to the bare cell 10 by welding. The first internal terminal 30 may be disposed inside the case 20.

Referring to FIGS. 3 to 5, the second internal terminal 40 is disposed below the bare cell 10. The second internal terminal 40 may be electrically connected to the bottom side of the bare cell 10. In this case, the second internal terminal 40 may be connected to the electrode lead 130 of the bare cell 10. The second internal terminal 40 may be coupled to the bare cell 10 by welding. The second internal terminal 40 may be disposed inside the case 20.

Referring to FIGS. 3 to 5, the first external terminal 50 is coupled to the first internal terminal 30. The first external terminal 50 may be electrically connected to the first internal terminal 30. Accordingly, the first external terminal 50 may be electrically connected to the bare cell 10 through the first internal terminal 30. The first external terminal 50 may be coupled to the case 20. A part of the first external terminal 50 may be disposed inside the case 20, and the remaining part may be disposed outside the case 20. An entirety of the first external terminal 50 may be disposed inside the case 20.

Referring to FIGS. 3 to 6, the coupling part 60 is disposed below the first external terminal 50. The coupling part 60 may support an edge of the first internal terminal 30. Accordingly, the electric double layer capacitor 1 according to the present disclosure may achieve the following effects.

First, the electric double layer capacitor 1 according to the present disclosure may firmly support the edge of the first internal terminal 30 using the coupling part 60 to enhance a connection force or coupling force between the first internal terminal 30 and the first external terminal 50. Therefore, the electric double layer capacitor 1 according to the present disclosure can reduce equivalent serial resistance (ESR) for the first internal terminal 30 and the first external terminal 50. Accordingly, the electric double layer capacitor 1 according to the present disclosure can have improved energy storage performance.

Second, in the electric double layer capacitor 1 according to the present disclosure, the first internal terminal 30 and the first external terminal 50 may be coupled through the coupling part 60 and then accommodated into the case 20. Accordingly, the electric double layer capacitor 1 according to the present disclosure may improve the ease of operation of coupling the first internal terminal 30 and the first external terminal 50. Further, in the electric double layer capacitor 1 according to the present disclosure, since the first internal terminal 30 and the first external terminal 50 are coupled at the outside of the case 20 through the coupling part 60, the case 20 requires no work space for the coupling of the first internal terminal 30 and the first external terminal 50. Therefore, the electric double layer capacitor 1 according to the present disclosure may be implemented to have greater energy density because a size of the case 20 can be reduced while maintaining a size of the bare cell 10.

The coupling part 60 may protrude downward from a lower surface of the first external terminal 50. The downward direction is a direction from the top side of the bare cell toward the bottom side of the bare cell. The coupling part 60 may be disposed to surround the edge of the first internal terminal 30. The edge of the first internal terminal 30 may include an outer side surface of the first internal terminal 30 disposed to face an inner circumferential surface of the case 20, and a part spaced a predetermined distance inward from the outer side surface of the first internal terminal 30. The coupling part 60 may be disposed inside the case 20.

Referring to FIGS. 2 to 7, the coupling part 60 may include a first protrusion 600 and a second protrusion 610.

The first protrusion 600 protrudes from the lower surface of the first external terminal 50 toward the bare cell 10. The first protrusion 600 may protrude in the downward direction. The first protrusion 600 may be brought into contact with the outer side surface of the first internal terminal 30.

The second protrusion 610 protrudes from the first protrusion 600. The second protrusion 610 may protrude from the first protrusion 600 toward the first internal terminal 30. Accordingly, the second protrusion 610 may support the edge of the first internal terminal 30. In this case, the second protrusion 610 may support a lower surface of the edge of the first internal terminal 30. In this way, the electric double layer capacitor 1 according to the present disclosure is implemented to firmly support the first internal terminal 30 using the second protrusion 610. In this case, the edge of the first internal terminal 30 may be fixedly surrounded by the lower surface of the first external terminal 50, an inner side surface of the first protrusion 600, and an upper surface of the second protrusion 610. That is, the edge of the first internal terminal 30 may be inserted between the first external terminal 50 and the second protrusion 610.

Meanwhile, the first internal terminal 30 may include a first plate 300, an extension part 310, and an insertion part 320. The first plate 300 is coupled to the bare cell 10. The extension part 310 is disposed on an edge of the first plate 300. The edge of the first plate 300 may be an outer side surface of the first plate 300. The extension part 310 may protrude from the edge of the first plate 300 toward the first external terminal 50. That is, the extension part 310 may protrude upward from the edge of the first plate 300. The insertion part 320 protrudes from the extension part 310 toward the inner circumferential surface of the case 20. Accordingly, the insertion part 320 may be inserted into the coupling part 60. In this case, the insertion part 320 may be inserted between the first external terminal 50 and the second protrusion 610. Therefore, the first internal terminal 30 may be firmly supported by the coupling part 60 using a structure in which the insertion part 320 is inserted into the coupling part 60.

The second protrusion 610 may be formed bent at a lower end of the first protrusion 600 toward the central axis A. In this case, the coupling part 60 and the first internal terminal 30 may be coupled through the following process.

Figure 7:
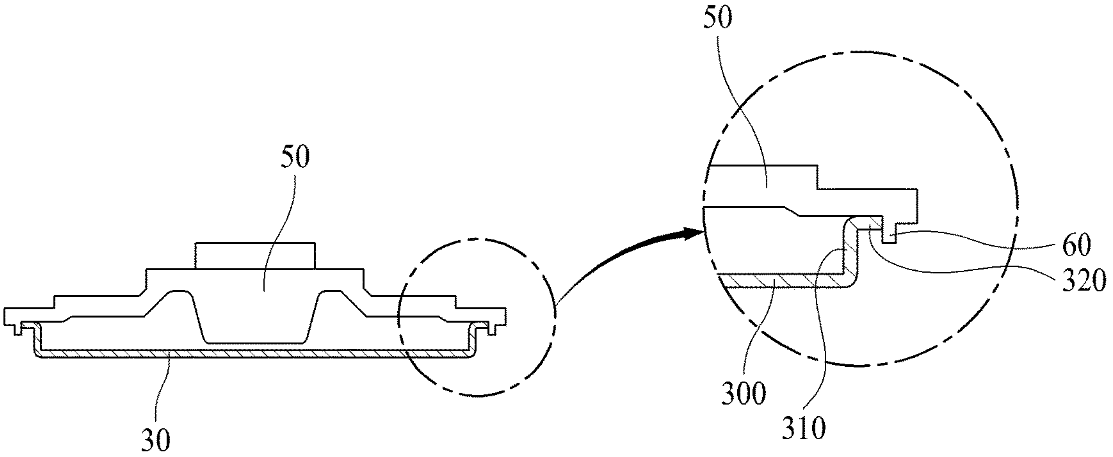
FIG. 7 is a view for describing the coupling of a first internal terminal and a coupling part illustrated in FIG. 3.
Figure 7:
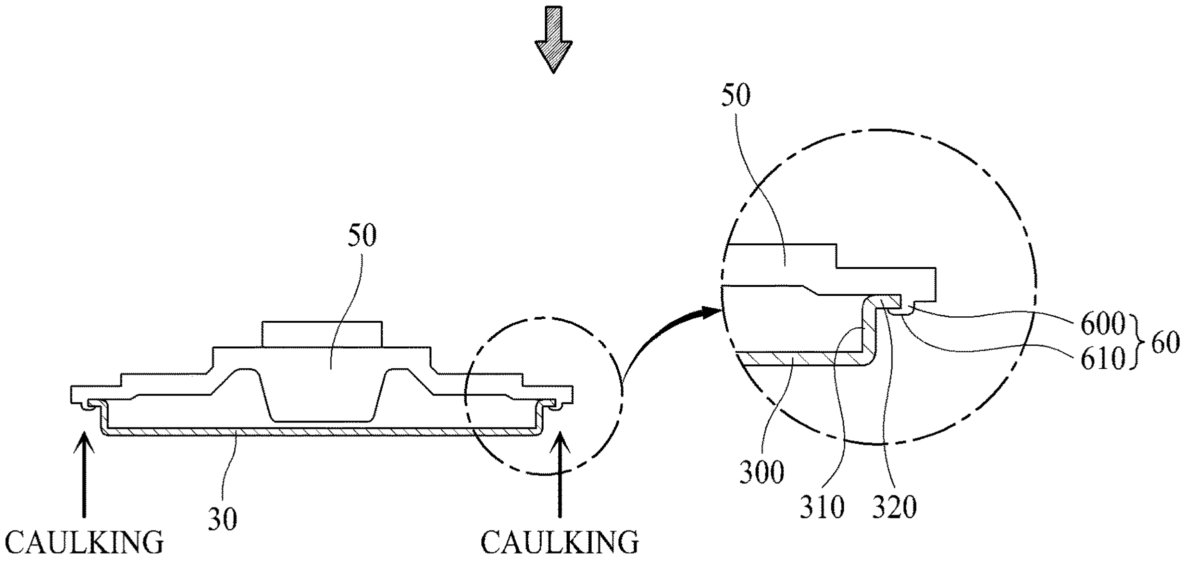
Figure 8:
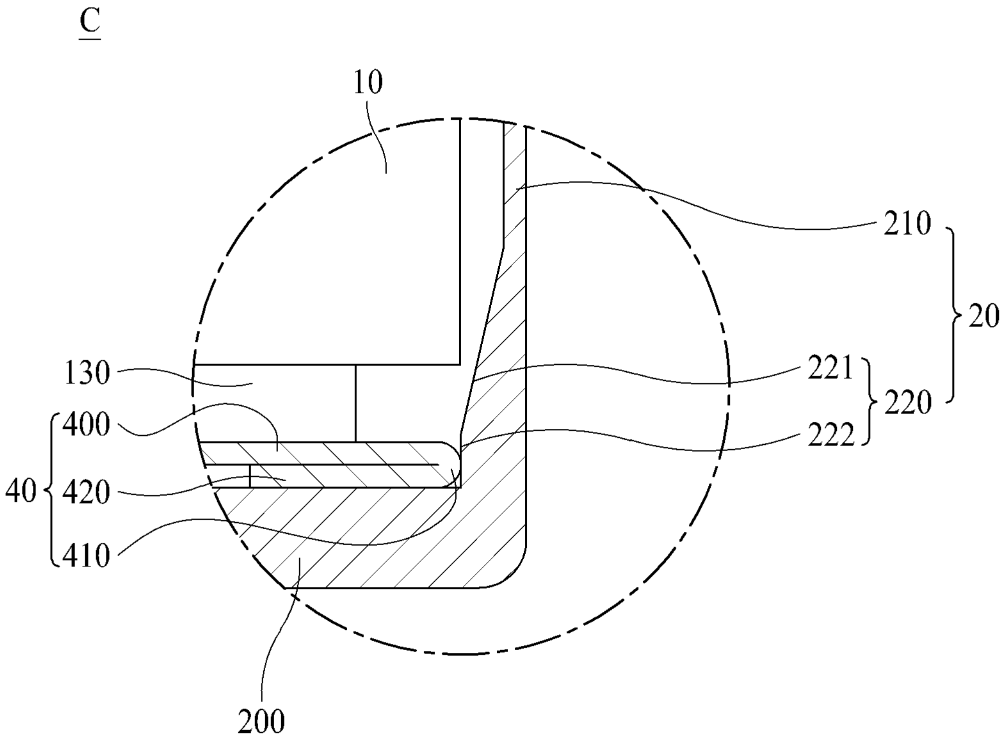
FIG. 8 is an enlarged view of portion C in FIG. 3.
Figure 9:
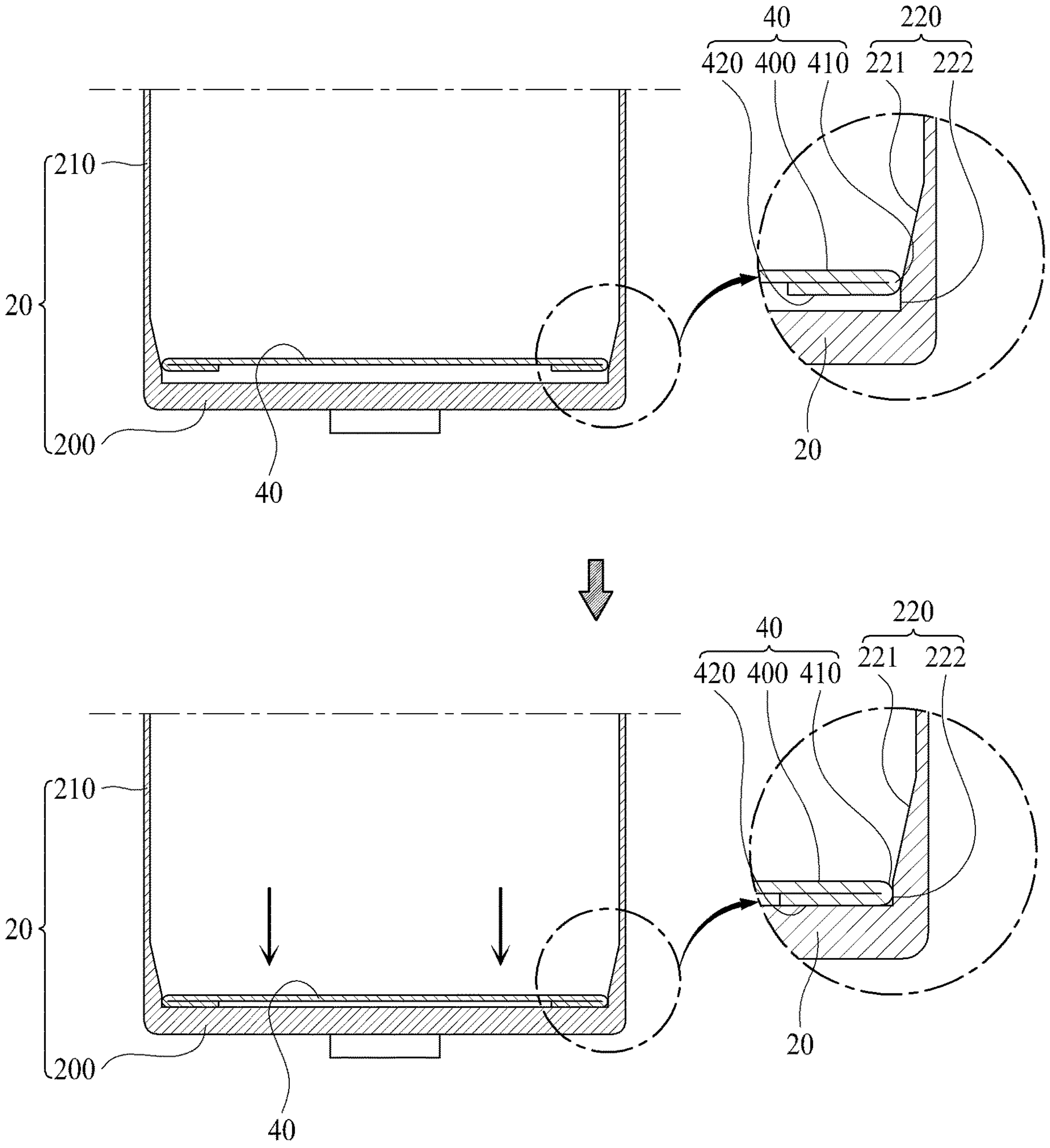
FIG. 9 is a view for describing the coupling of a second internal terminal and a pressing part illustrated in FIG. 3.

As illustrated in a top side of FIG. 7, before the first internal terminal 30 and the coupling part 60 are coupled, the coupling part 60 may protrude downward from the lower surface of the first external terminal 50. In a state in which the first internal terminal 30 is inserted into the coupling part 60, a part of the coupling part 60 may be bent by caulking, as illustrated in a bottom side of FIG. 7. Accordingly, the insertion part 320 of the first internal terminal 30 may be firmly supported by the coupling part 60 by being inserted into the coupling part 60. In this case, the coupling part 60 may surround and fix the insertion part 320 of the first internal terminal 30. Meanwhile, the part that supports a lower surface of the first internal terminal 30 by being bent by the caulking may correspond to the second protrusion 610.

The coupling part 60 may be formed to have a thickness of 0.2 mm or more and 3 mm or less. Even when the coupling part 60 is formed to be thin in this way, the electric double layer capacitor 1 according to the present disclosure may firmly support the first internal terminal 30 using a structure in which the first internal terminal 30 is inserted into the coupling part 60. Therefore, since it is possible to reduce a size of a space inside the case 20 occupied by the coupling part 60, the electric double layer capacitor 1 according to the present disclosure may be implemented to have greater energy density by further reducing the size of the case 20 while maintaining the size of the bare cell 10.

Referring to FIGS. 2 to 7, the electric double layer capacitor 1 according to the present disclosure may include an insulating part 70.

The insulating part 70 is disposed on an edge of the first external terminal 50. An edge of the insulating part 70 may include an outer side surface of the insulating part 70 disposed toward the inner circumferential surface of the case 20 and a part spaced a predetermined distance inward from the outer side surface of the insulating part 70. The insulating part 70 may be disposed inside the case 20. The insulating part 70 may be disposed between the edge of the first external terminal 50 and the case 20 to insulate the first external terminal 50 from the case 20. The insulating part 70 may surround an upper surface, a side surface, and the lower surface of the first external terminal 50.

When the insulating part 70 is provided, the case 20 may include a beading part 230. The beading part 230 protrudes toward the first internal terminal 30. The beading part 230 may support the insulating part 70 so that the first external terminal 50 is supported through the insulating part 70. Accordingly, the electric double layer capacitor 1 according to the present disclosure not only may firmly support the insulating part 70 using the beading part 230 so that the insulating part 70 maintains the first external terminal 50 and the case 20 to be insulated from each other, but also firmly support the first external terminal 50 so that the first external terminal 50 and the first internal terminal 30 are maintained to be coupled to each other. The beading part 230 may be disposed below the insulating part 70.

When the insulating part 70 is provided, the case 20 may include a curling part 240. The curling part 240 may be bent toward the upper surface of the first external terminal 50 at an upper end of the case 20. The curling part 240 may be formed to have a predetermined curvature.

The insulating part 70 may include a first insulating part 700 and a second insulating part 710.

The first insulating part 700 is disposed on the edge of the first external terminal 50. The first insulating part 700 may be brought into contact with the side surface, the upper surface, and the lower surface of the first external terminal 50. The first insulating part 700 may be supported by the beading part 230. The coupling part 60 may be disposed between the first insulating part 700 and the insertion part 320.

The second insulating part 710 may be disposed above the first external terminal 50 and the first insulating part 700. A part of the second insulating part 710 may be inserted into the curling part 240. Accordingly, the second insulating part 710 may be supported by the curling part 240. In this case, an upper part of the insulating part 70 may be supported by the curling part 240 and a lower part of the insulating part 70 may be supported by the beading part 230, and thus the insulating part 70 may be more firmly supported by the case 20.

Here, the electric double layer capacitor 1 according to the present disclosure may be implemented to increase a coupling force with respect to the second internal terminal 40. To this end, the second internal terminal 40 and the case 20 may be implemented as follows.

Referring to FIGS. 2 to 9, the second internal terminal 40 may be implemented to be tightly fitted into the case 20. Accordingly, the second internal terminal 40 may be easily coupled to the case 20 and may be firmly fixed to the case 20. Further, the electric double layer capacitor 1 according to the present disclosure may increase the coupling force with respect to the second internal terminal 40 using tight fit to enhance a connection force or coupling force between the second internal terminal 40 and the second external terminal. Therefore, the electric double layer capacitor 1 according to the present disclosure can reduce ESR for the second internal terminal 40 and the second external terminal. Accordingly, the electric double layer capacitor 1 according to the present disclosure can have improved energy storage performance.

The second internal terminal 40 may include a second plate 400, a tightly fitted part 410, and a case contact part 420.

The second plate 400 is disposed to face a lower surface of the bare cell 10. The second plate 400 may be coupled to the electrode lead 130 of the bare cell 10 by welding.

The tightly fitted part 410 is disposed on an edge of the second plate 400. The edge of the second plate 400 may include an outer side surface of the second plate 400 disposed to face the inner circumferential surface of the case 20 and a part spaced a predetermined distance inward from the outer side surface of the second plate 400. The tightly fitted part 410 may be tightly fitted into the case 20. The tightly fitted part 410 and the second plate 400 may be formed integrally.

The case contact part 420 is coupled to the tightly fitted part 410. The case contact part 420 may protrude from the tightly fitted part 410 toward the central axis A. The case contact part 420 may be brought into contact with the case 20. In this case, the case contact part 420 may be brought into surface contact with the bottom part 200 of the case 20. Therefore, the case 20 and the second internal terminal 40 may be electrically connected. In this case, the case 20 may function as the second external terminal. An external protrusion 250 may be disposed below the bottom part 200. The external protrusion 250 protrudes from a lower surface of the bottom part 200. The external protrusion 250 may be coupled to a busbar (not illustrated). Meanwhile, an insulating part (not illustrated) may be interposed between a lower end of the bare cell 10 and the case 20.

The case contact part 420, the tightly fitted part 410, and the second plate 400 may be formed integrally. In this case, the tightly fitted part 410 may be formed to be bent toward the case contact part 420 at the edge of the second plate 400. Accordingly, in the process in which the second internal terminal 40 is tightly fitted into the case 20, the tightly fitted part 410 and the case contact part 420 are implemented to be deformed by a pressing force. Therefore, the electric double layer capacitor 1 according to the present disclosure may firmly couple the second internal terminal 40 to the case 20 and also improve the ease of operation of coupling the second internal terminal 40 to the case 20. The second plate 400, the tightly fitted part 410, and the case contact part 420 may be implemented with an integrally formed metal material.

Referring to FIGS. 2 to 9, the case 20 may include a pressing part 220.

The pressing part 220 is disposed below the sidewall part 210. The pressing part 220 may protrude from an inner circumferential surface of the sidewall part 210. Accordingly, when the second internal terminal 40 is inserted into the case 20, the pressing part 220 may press the second internal terminal 40 and forcibly fix the second internal terminal 40.

The pressing part 220 may include an inclined part 221 and a fixing part 222.

The inclined part 221 is formed so that a length of the inclined part 221 protruding from the inner circumferential surface of the sidewall part 210 increases as the inclined part 221 extends in the downward direction. An inner diameter of the inclined part 221 may be formed to decrease in size as the inclined part 221 extends in the downward direction. Accordingly, the inclined part 221 may be implemented so that an entrance area for inserting the second internal terminal 40 into the case 20 can increase, and thus the ease of operation of inserting the second internal terminal 40 into the case 20 can be improved. Further, the inclined part 221 may be implemented so that the second internal terminal 40 can be gradually tightly fitted into the case 20 while being inserted into the case 20, and thus the ease of operation of tight fit the second internal terminal 40 into the case 20 can be improved. The inclined part 221 may be disposed above the fixing part 222.

The fixing part 222 is disposed between the inclined part 221 and the bottom part 200. The fixing part 222 may press and fix the second internal terminal 40. In this case, the second internal terminal 40 may be tightly fitted into the case 20 by the fixing part 222. The length of the fixing part 222 protruding from the inner circumferential surface of the sidewall part 210 may be constant as the fixing part 222 extends in the downward direction. As illustrated in a top side of FIG. 9, the second internal terminal 40 may be tightly fitted into the case 20 by the inclined part 221 while being inserted into the case 20, and then, as illustrated in a bottom side of FIG. 9, the second internal terminal 40 may be finally tightly fitted into the case 20 by the fixing part 222.

Figure 10:
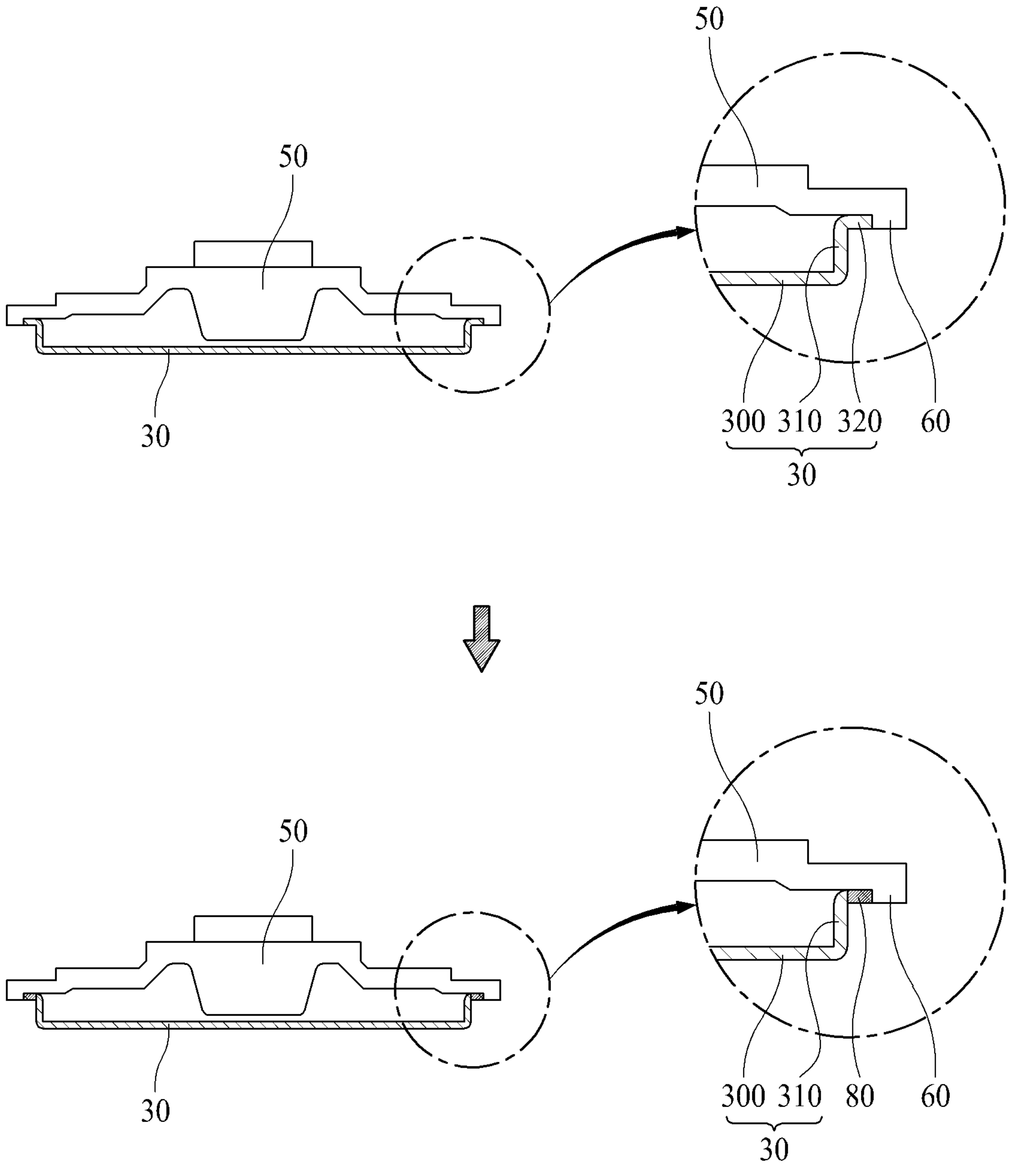
FIG. 10 is a view illustrating another embodiment of the electric double layer capacitor illustrated in FIG. 3.

Referring to FIGS. 2 to 10, an electric double layer capacitor 1 according to a modified embodiment of the present disclosure may include a welding coupling part 80 (illustrated in FIG. 10).

The welding coupling part 80 is melted to couple an edge of a first internal terminal 30 and a lower part of a first external terminal 50. By providing the welding coupling part 80, the electric double layer capacitor 1 according to the present disclosure may achieve the following effects.

First, the electric double layer capacitor 1 according to the present disclosure can enhance a connection force or coupling force between the first internal terminal 30 and the first external terminal 50 using the welding coupling part 80. Accordingly, the electric double layer capacitor 1 according to the present disclosure can reduce ESR for the first internal terminal 30 and the first external terminal 50. Therefore, the electric double layer capacitor 1 according to the present disclosure can have improved energy storage performance.

Second, in the electric double layer capacitor 1 according to the present disclosure, it is possible for the first internal terminal 30 and the first external terminal 50 to be coupled at the outside of a case 20 by the welding coupling part 80 and then accommodated into the case 20. Accordingly, in the electric double layer capacitor 1 according to the present disclosure, the case 20 requires no work space for the coupling of the first internal terminal 30 and the first external terminal 50. Therefore, the electric double layer capacitor 1 according to the present disclosure can be implemented to have greater energy density because a size of the case 20 can be reduced while maintaining a size of a bare cell 10.

As illustrated in a top side of FIG. 10, an insertion part 320 and the first external terminal 50 may be melted by welding while the insertion part 320 and a coupling part 60 are brought into contact with each other, and thus the welding coupling part 80 that couples the first internal terminal 30 and the first external terminal 50 may be formed as illustrated in FIG. 10. The insertion part 320 and the first external terminal 50 may be welded by ultrasonic waves, lasers, etc. An entirety of the insertion part 320 and a part of the first external terminal 50 may be melted so that the welding coupling part 80 may be formed. A part of the insertion part 320 and a part of the first external terminal 50 may be melted so that the welding coupling part 80 may be formed. In this case, the welding coupling part 80 may be disposed between the insertion part 320 and the first external terminal 50. The coupling part 60 may be melted and coupled to the insertion part 320.

The present disclosure described above is not limited to the above-described embodiments and the accompanying drawings, and it will be clear to those skilled in the art that various substitutions, modifications, and changes can be made without departing from the technical spirit of the present disclosure.

What is claimed is:

1. An electric double layer capacitor comprising:
- a bare cell;
- a case configured to accommodate the bare cell;
- a first internal terminal disposed above the bare cell;
- a second internal terminal disposed below the bare cell;
- a first external terminal coupled to the first internal terminal;
- a welding coupling part melted to couple an edge of the first internal terminal and a lower part of the first external terminal;
- a first insulating part, disposed on an edge of the first external terminal, wherein the first insulating part is brought into contact with a side surface, an upper surface, and a lower surface of the first external terminal; and
- a second insulating part, disposed above the first external terminal and the first insulating part, wherein a portion of the second insulating part is inserted into a curling part of the case.

2. The electric double layer capacitor of claim 1, wherein the second internal terminal is tightly fitted into the case.

3. The electric double layer capacitor of claim 1, wherein the case includes:
- a bottom part;
- a sidewall part disposed on an edge of the bottom part; and
- a pressing part disposed below the sidewall part and protruding from an inner circumferential surface of the sidewall part.

4. The electric double layer capacitor of claim 3, wherein the pressing part includes:
- an inclined part that is formed to increase in length of the inclined part protruding from the inner circumferential surface of the sidewall part as the inclined part extends downward from a top side of the bare cell toward a bottom side of the bare cell; and
- a fixing part disposed between the inclined part and the bottom part, the fixing part pressing and fixing the second internal terminal.

5. The electric double layer capacitor of claim 1, wherein the second internal terminal includes:
- a second plate facing a lower surface of the bare cell;
- a tightly fitted part disposed on an edge of the second plate; and
- a case contact part that is coupled to the tightly fitted part and brought into contact with the case.

6. The electric double layer capacitor of claim 5, wherein the tightly fitted part is formed bent toward the case contact part at the edge of the second plate.

7. The electric double layer capacitor of claim 1, wherein the welding coupling part has a thickness between 0.2 and 3 millimeters (mm).

* * * * *